(12) United States Patent
He (10) Patent No.: US 9,015,478 B2
(45) Date of Patent: *Apr. 21, 2015

(54) SYSTEM AND METHOD FOR PREVENTING WEB CRAWLER ACCESS

(71) Applicant: Alibaba Group Holding Limited, George Town (KY)

(72) Inventor: Ling He, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,772

(22) Filed: Feb. 27, 2014

(65) Prior Publication Data

US 2014/0201522 A1    Jul. 17, 2014

Related U.S. Application Data

(63) Continuation of application No. 12/460,302, filed on Jul. 15, 2009, now Pat. No. 8,762,705.

(30) Foreign Application Priority Data

Jul. 24, 2008    (CN) .......................... 2008 1 0134453

(51) Int. Cl.
*H04L 9/00*    (2006.01)
*H04L 29/06*    (2006.01)

(52) U.S. Cl.
CPC ........ *H04L 63/1466* (2013.01); *H04L 63/0428* (2013.01); *H04L 2463/041* (2013.01); *H04L 63/0457* (2013.01)

(58) Field of Classification Search
USPC .......................................... 713/160
See application file for complete search history.

(56) References Cited

U.S. PATENT DOCUMENTS 8,145,898 B2 * 3/2012 Kamalakantha .............. 713/156

OTHER PUBLICATIONS

"A web middleware architecture for dynamic customization of web content for Non-traditional clients"; Steinberg et al; Proceeding of WWW '02 Proceedings of the 11th international conference on World Wide Web; 28 Pages.*

* cited by examiner

*Primary Examiner* — Jason Lee
(74) *Attorney, Agent, or Firm* — Van Pelt, Yi & James LLP (57) ABSTRACT

Preventing web crawler access includes receiving a request for a webpage that includes web content that is to be protected from a web crawler, encrypting the web content to be protected to generate encrypted content and responding to the request, including sending the encrypted content and a decryption instruction. The decryption instruction is configured to allow a web browser to decrypt the encrypted content.

17 Claims, 6 Drawing Sheets

SYSTEM AND METHOD FOR PREVENTING WEB CRAWLER ACCESS

CROSS REFERENCE TO OTHER APPLICATIONS

This application is a continuation of co-pending U.S. patent application Ser. No. 12/460,302, entitled SYSTEM AND METHOD FOR PREVENTING WEB CRAWLER ACCESS filed Jul. 15, 2009 which is incorporated herein by reference for all purposes, which claims priority to PRC Patent Application No. 200810134453.8 entitled METHOD, SYSTEM, AND APPARATUS FOR ENCRYPTING AND DECRYPTING WEBPAGES filed Jul. 24, 2008 which is incorporated herein by reference for all purposes.

TECHNICAL FIELD

The present invention relates generally to field of Internet technology and more particularly to a method, system and device for preventing web crawlers from accessing protected information.

BACKGROUND

Web crawlers are software programs that automatically download and extract information from the World Wide Web. The crawler selectively accesses the webpage and relevant links in the World Wide Web to obtain required information according to an established objective. The crawler is often used for data collection from the network and data upload to the database of search engines. Some crawlers, however, gather specific types of information on webpages, such as email addresses, for malicious purposes, such as sending spam. Sometimes crawlers also harvest useful contents from websites and misappropriate such information without obtaining permission from the creators of the information. Thus, some webpage content should be protected from web crawlers.

Existing anti-crawl techniques typically involve setting a maximum number of access requests for a single IP user in a unit of time, tracking the requests of every single IP user when the user accesses the website and recording the number of requests to the website by the user in a unit of time. The system determines whether the number of requests to the website by a user in a unit of time recorded by the system exceeds the maximum number of access requests of a single IP user in a unit of time set by the website. If the maximum number is not exceeded, the user requests are accepted; otherwise, it is determined that the requests are crawling requests by crawlers and the requests of that user are refused. Other actions such sending a notification to the user or shielding the IP directly may be performed.

Existing anti-crawl techniques can lead to poor experiences for users who make frequent requests to the website, since the requests may be deemed as malicious crawling and be refused. Moreover, the crawler can also deceive the inspection of the website server by forging its IP address in order to crawl the information on targeted websites.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Preventing web crawler access to web content is described. In some embodiments, unencrypted web content that would otherwise be plainly visible to web crawlers is encrypted. When a web client makes a request for the web content, the web server provides the encrypted content along with a decryption function that a normal web browser would be able to execute to decrypt the encrypted content and render the decrypted content. Since a web crawler that targets specific content is unlikely to be able to execute the decryption function and decrypt the content, the content is thereby protected.

Figure 1:
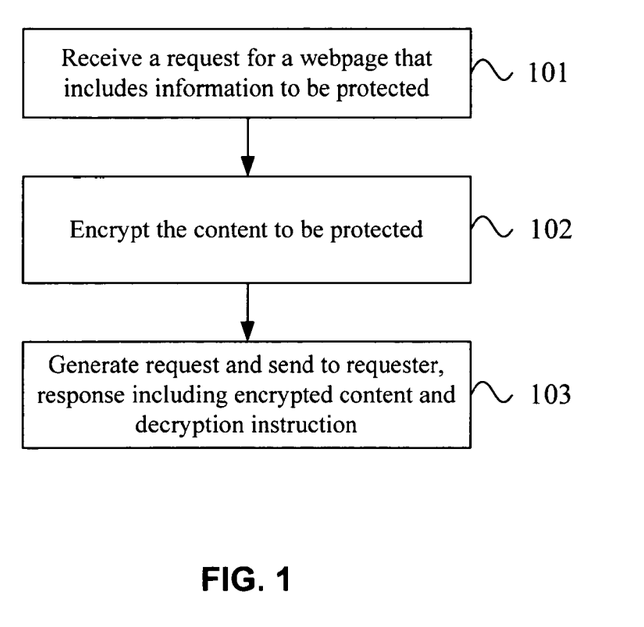
FIG. 1 is a flowchart illustrating an embodiment of a process for preventing web crawler access.

FIG. 1 is a flowchart illustrating an embodiment of a process for preventing web crawler access. The process may be executed on a web server system.

In this example, at 101, a request is received for a webpage that includes certain information that should be protected. For example, a request may involve an HTTP GET request for a webpage that includes certain electronics merchandise for sale. Since the website owner does not wish to share the pricing and availability of the merchandise with other websites, this information should be protected from web crawlers. At 102, the content to be protected is encrypted using an encryption process and encrypted content is generated. A detailed example of the encryption process is described below. This step may be carried out prior to, contemporaneously with or after the request has been received. At 103, a response to the request is generated and sent to the requester. In some embodiments, the response includes a formatted Hypertext Mark-up Language (HTML) page that includes the encrypted content and a decryption instruction. As will be described in greater detail below, the decryption instruction in some embodiments includes a function call that is configured to be executed by a regular web browser and allow the web browser to decrypt the encrypted content.

In some embodiments, encryption of the content that requires protection is performed by a website server using a fast permutation and combination technique and decryption of the contents of the encrypted webpage is performed by a client browser. Thus, a regular user that uses a standard browser to access the website would not be refused service no matter how frequently he/she accesses the webpage, while a web crawler that spoofs its IP address but lacks the ability to execute the decryption instruction would not be able to access the protected content.

Figure 2:
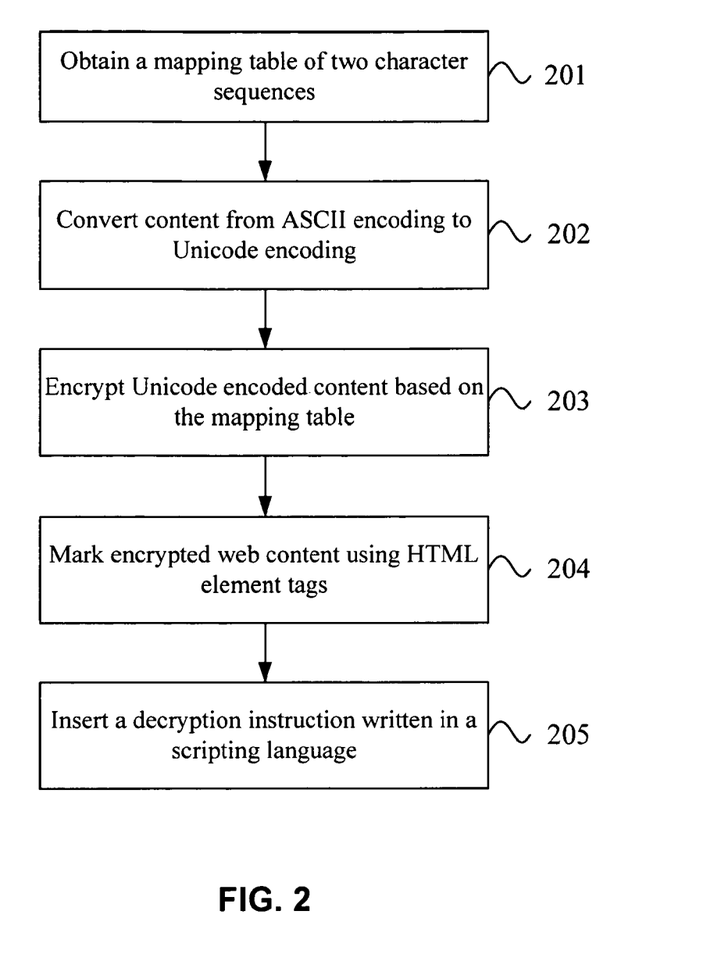
FIG. 2 is a flowchart illustrating an embodiment of an encryption process that is used to generate the encrypted content.

FIG. 2 is a flowchart illustrating an embodiment of an encryption process that is used to generate the encrypted content. The process may be carried out on the server.

At 201, a mapping table of two character sequences is obtained. In some embodiments, this step includes forming a first sequence of characters (e.g., 0, 1, 2, 3, 4, 5, 6, 7, 8, 9, &, # and ;), traversing every character of the first sequence and generating a random number for every character of the first sequence to obtain a new sequence with 13 random numbers, rearranging the 13 random numbers according to their values by the website server with bubble sort, thus obtaining a number queue of 13 random numbers; replacing every random number of the number queue with its corresponding character of the first queue by the website server, thus obtaining a second queue formed by the 13 characters above (e.g., 4, 7, 2, #, 0, 3, &, 6, 1, 8, 9, ; and 5). Every time a new access request is received, a new mapping is obtained to make sure that the mapping is as random as possible.

It is assumed that the webpages are implemented using tools such as Java servlet, Active Server Page (ASP), Personal Homepage Program (PHP), C#, etc. In this example, at 202, an encrypting program operating on the server converts the webpage contents that require protection from American Standard Code for Information Interchange (ASCII) encoding to Unicode encoding. Unicode is a kind of character encoding used on computer, which sets a unique and uniform binary code for every character in every kind of language in order to satisfy the requirements of cross-language and cross-platform text conversion and processing. The Unicode codes are comprised of these characters: 0, 1, 2, 3, 4, 5, 6, 7, 8, 9, &, # and ;. The encrypting programs of the server are implemented using a programming language such as Java, C, ASP, PHP or any other appropriate programming language.

At 203, using the mapping table that was generated in 201, every character in the strings of the webpage content coded with Unicode is replaced with the corresponding character in the second queue of the mapping table. Take the example above, Unicode codes of 0, 1, 2, 3, 4, 5, 6, 7, 8, 9, &, # and ; are replaced with corresponding 4, 7, 2, #, 0, 3, &, 6, 1, 8, 9, ; and 5, respectively. The arrangement of the values in the second queue of the mapping table is random, which means that every character in the webpage coded with Unicode is replaced by a random character to form a new string. The Unicode characters of the webpage contents to be protected is converted to encrypted Unicode characters according to the mapping table and the encryption of the webpage contents is completed on the server.

At 204, the encrypted webpage content is marked using HTML element tags such as layer div, html table and table cell.

At 205, a decryption instruction written in a scripting language is inserted somewhere in the encrypted webpage. Examples of the scripting language include JavaScript, VBScript, Flash Script, etc. The function name of decryption call is generated randomly in some embodiments. In some embodiments, the script code is inserted into a random location of the HTML source codes of the webpage, so that a crawler cannot predict where the decryption instruction is located. The written format of the scripting language code such as line break, space, etc. can be generated and defined randomly. The function name, format and position in the webpage of the scripting language which is used for contents decryption can all be random.

Figure 3:
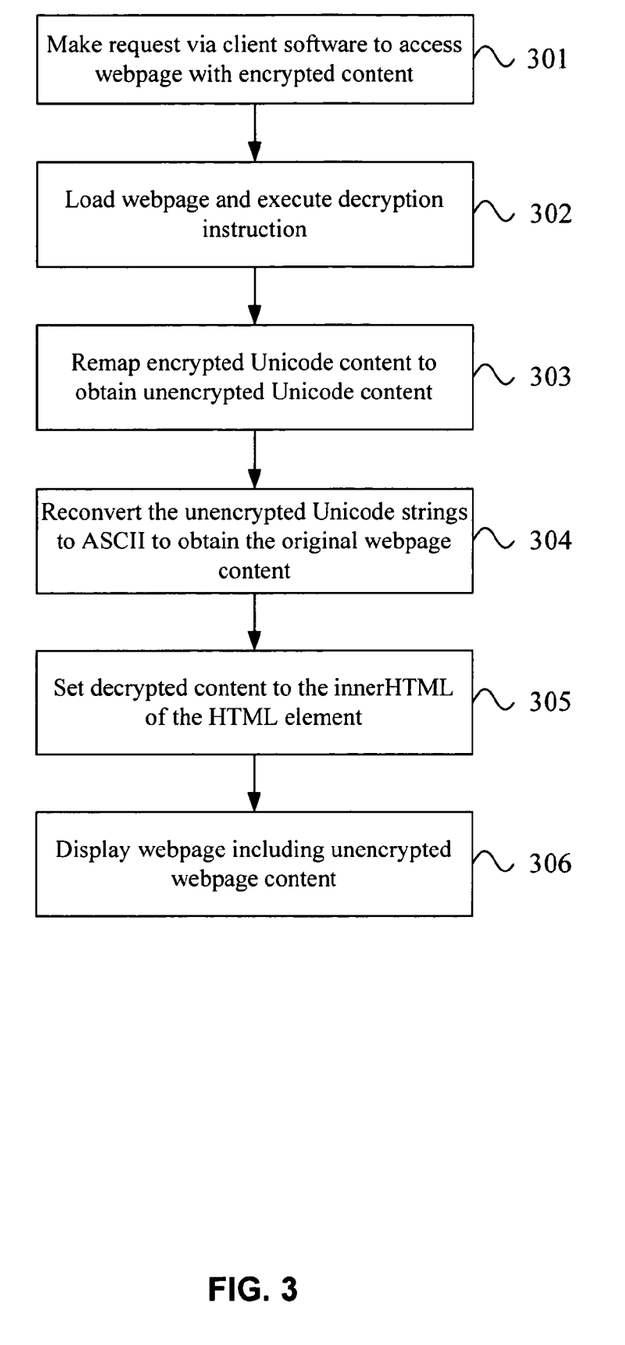
FIG. 3 is a flowchart illustrating an embodiment of a decryption process.

FIG. 3 is a flowchart illustrating an embodiment of a decryption process. The process may be performed on a client device such as a computer or mobile device executing a client program such as a web browser.

At 301, a user request is made via the web browser to access the webpage with encrypted content. For example, the browser may send an HTTP GET request for a webpage of interest to the user.

At 302, the browser loads the webpage and executes the decryption instruction.

In some embodiments, according to the decryption script, the browser locates the appropriate HTML tag to obtain the encrypted webpage contents. The decryption instruction performs the reverse operations of the simple encryption process described above. At 303, the decryption instruction instructs the browser to remap the encrypted Unicode content according to the one-to-one correspondence relationship in the mapping table which was generated in step 201 of the encryption process, thereby obtaining unencrypted Unicode character strings.

At 304, the decryption instruction instructs the browser to re-convert the unencrypted Unicode strings to ASCII to obtain the original, unencrypted webpage content.

At 305, the browser sets the decrypted webpage contents obtained by the browser to the innerHTML of the corresponding HTML element.

At 306, the browser displays the webpage, including the unencrypted content. Since the content is has been decrypted, the user experience is the same as no encryption ever took place.

The following is an example source code of a webpage that includes encrypted web content.

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml" dir="ltr">
    <head>
        <meta http-equiv="Content-Type" content="text/html; charset=GBK"/>
        <title>An offer Example</title>
```

```
        </head>
<body>
<!-- the offer's title was encrypted -->
<h1><span
id="titleSpan">67481;2367494&43674#841367410;43674#1;#3671&0;83674;24;367192&
0367459453</span></h1>
<!-- the offer's title was encrypted -->
<h2>Unit Price: $300<h2>
<h2>Shipping Cost: $200<h2>
<h2>Contact: Mr.Green </h2>
<h2>Phone number: (415)555-8528 </h2>
<div>Energy saving clothes washer. One year warranty.</div>
<!-Script for decryption -->
<script language="JavaScript">
function U2A(str) {
        var code = str.match (/&#(\d+) ; /g) ;
        var res = '';
        if (code == null) { return ''; }
        for (var i=0; i<code.length; i++)
        res += String.fromCharCode (code[i].replace (/[&#;]/g, ''));
        return res;
}
var table_origin = new
Array ('3','7','#','4','6','8','&','2','1',';','5','0','9') ;
var table_trans = new
Array ('1',';',';','7','9','5','#','6','4','&','3','0','8','2') ;
function changeChar (char, table1, table2) {
var res ='';
if (table1.length != table2.length)
{
return '';
}
        for (var i =0;i<table1.length;i++) {
            if (table1[i]== char) {
                return table2 [i] ;
            }
        }
return res;
}
function escapeAnd (str) {
    return str.replace (new RegExp("&","gm"),"&") ;
}
function changeStr (str, table1, table2) {
        var res = "";
        for (var i=0; i<str.length; i++) {
        res += changeChar (str.charAt(i), table, table2) ;
        }
        return res;
}
function decrypt (str) {
        return changeStr (str, table_trans, table_origin);
}
function decryptTitle ( ) {
        var str = escapeAnd (document.getElementById ("titleSpan") .innerHTML) ;
        var str_U = decrypt (str) ;
        var title = U2A (str_U) ;
        document.getElementById ("titleSpan") .innerHTML = title;
        return title;
}
decryptTitle ( ) ;
</script>
</body>
</html>
```

In the example shown, the title of the webpage, which contains full name/model of the product for sale, is encrypted. A decryption instruction (i.e., script implementing the "decryptTitle" function) is inserted in a random location on the page. A normal web browser accessing the above webpage would invoke JavaScript to decrypt the title. A web crawler, however, typically only collects a portion of the content and does not invoke scripts on the page. Moreover, since the position of the scripting language for decryption is random, even if the crawler had the capability to execute scripts, it is difficult for the web crawler programs to find the decryption script to decrypt the encrypted portion in the webpage. The crawler gathers contents of the webpage, including the encrypted content (in this case, the title of the product). Since the stored encrypted information cannot be easily searched or made useful, the objective of the website owner to protect proprietary content (in this case, information about the specific product being offered for sale) is achieved.

The encryption/decryption techniques described above are for purposes of example only. Many other ways of encrypting/decrypting the content can be used, so long as the encryption/decryption is fast.

Figure 4:
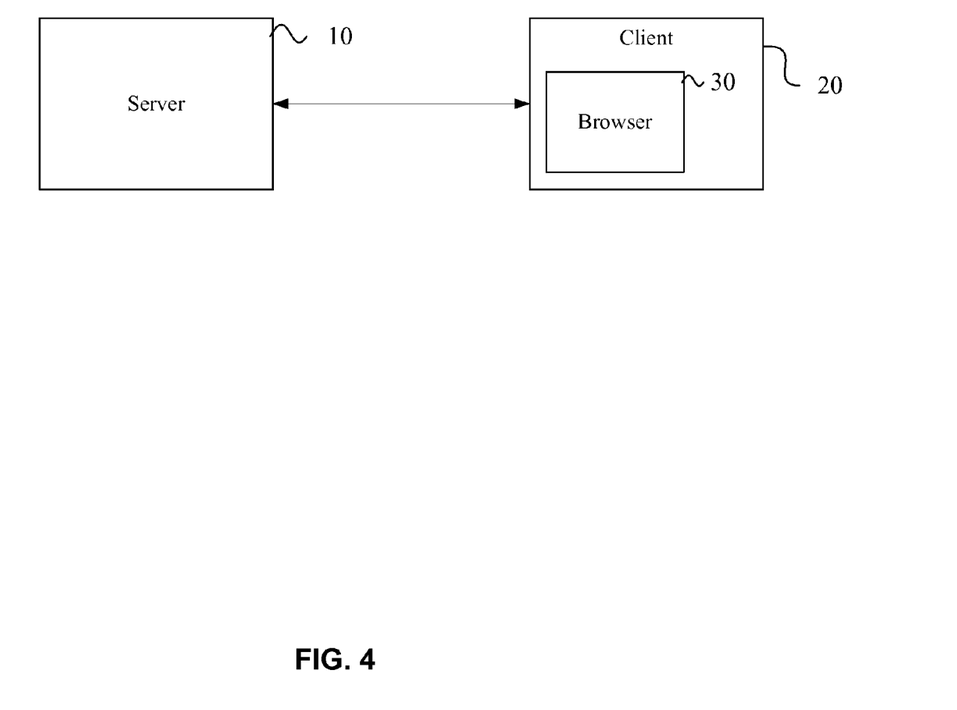
FIG. 4 is a block diagram illustrating an embodiment of a system for implementing the processes described above.

FIG. 4 is a block diagram illustrating an embodiment of a system for implementing the processes described above. The system includes a server 10 configured to encrypt the webpage contents and send the encrypted page to a client device. Server 10 is capable of performing an encryption process such as the examples described in connection with FIG. 1 and FIG. 2. The system further includes a client device 20, which may be a personal computer, a mobile device, such as a mobile phone with browsing capabilities or any other appropriate device on which a browser 30 operates. The browser is capable of decrypting the encrypted web page content and displaying the decrypted webpage contents to a user, using a process such as the example described in FIG. 3.

Figure 5:
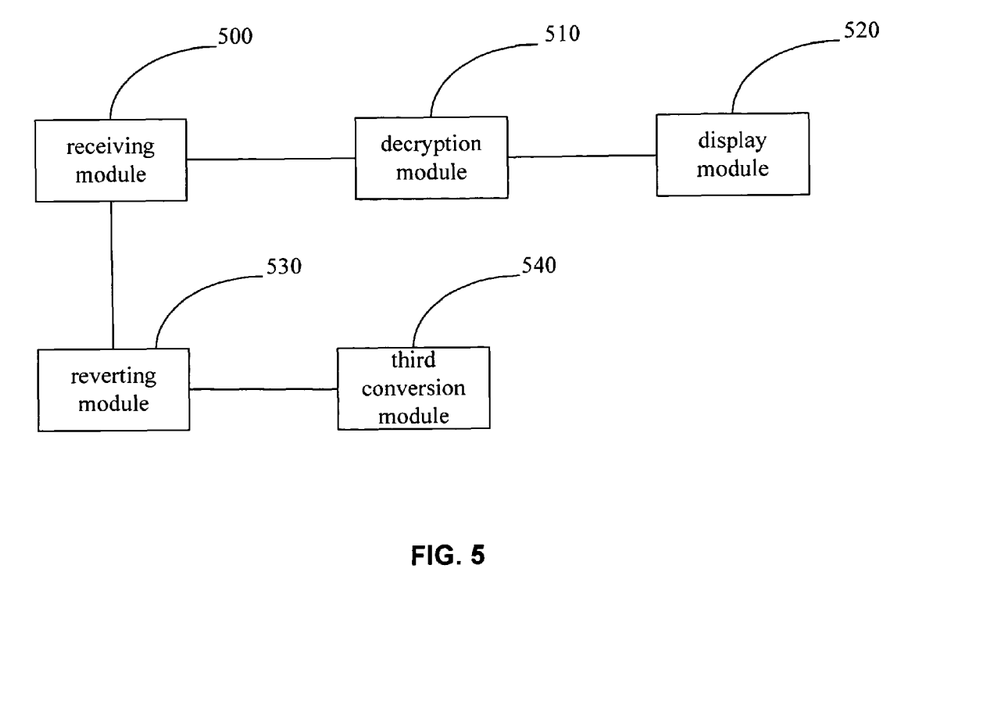
FIG. 5 is a block diagram illustrating an embodiment of a client system configured to decrypt the webpage.

FIG. 5 is a block diagram illustrating an embodiment of a client system configured to decrypt the webpage. The system includes a receiving module 500 (e.g., a communication interface such as a port, cable, wireline or wireless network interface card, etc. and internal connections such as a communication bus) configured to obtain the encrypted webpage contents with the scripting language, a decryption module 510 configured to decrypt the encrypted contents received by the receiving module 500, a display module 520 configured to display the decrypted contents decrypted by the decryption module 510, a reverting module 530 configured to revert the Unicode characters of the encrypted webpage contents received by the receiving module 500 to the Unicode characters before encryption and obtaining decrypted strings coded with Unicode, a third conversion module 540 configured to convert the decrypted strings coded using Unicode reverted by the reverting module 530 to strings coded using ASCII and obtain the decrypted webpage contents.

Figure 6:
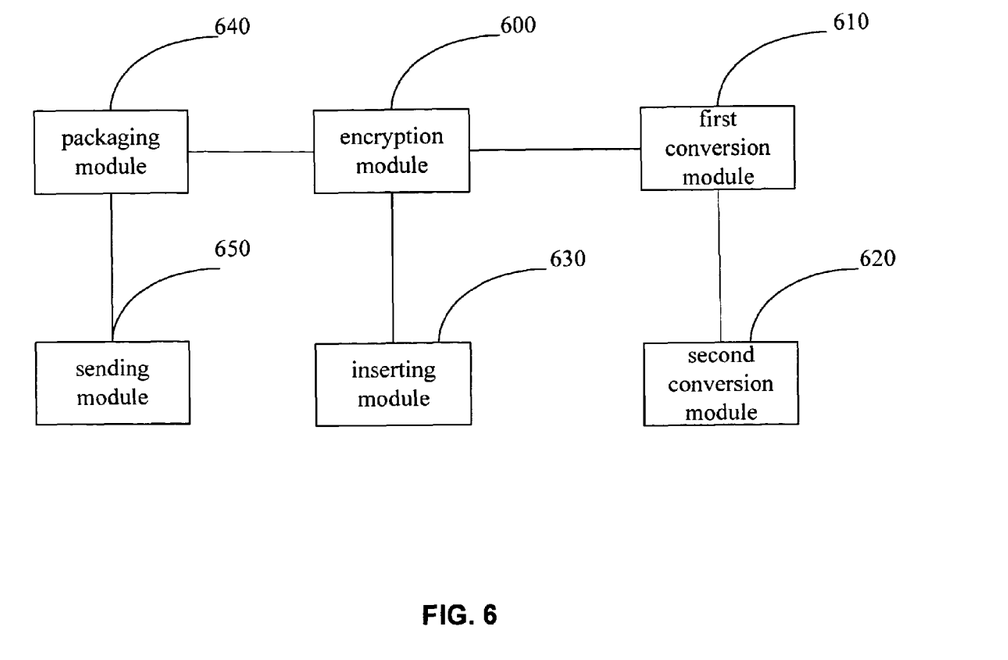
FIG. 6 is a block diagram illustrating an embodiment of a server system configured to encrypt the webpage content.

FIG. 6 is a block diagram illustrating an embodiment of a server system configured to encrypt the webpage content. The system includes an encryption module 600 to encrypt the webpage contents with a encryption algorithm on the server, a first conversion module 610 to convert the webpage contents which need to be encrypted by the encryption module 600 from ASCII to Unicode, a second conversion module 120 to convert the Unicode characters converted by the first conversion module 110 of the webpage contents which need to be encrypted to encrypted Unicode characters, an inserting module 130 configured to insert a scripting language which is used to decrypt the encrypted contents encrypted by the encryption module 100 of the webpage into somewhere of the webpage encrypted by the encryption module 100, a packaging module 140 configured to package the encrypted webpage contents which is encrypted by the encryption module 100 using HTML element tags which include identity marks and a sending module 150 configured to send the encrypted contents packaged by the packaged module 140 of the webpage to a client browser.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EPROM, CD-ROM or other optical disk storage, magnetic disk storage or other magnetic storage devices or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer or special purpose processing device to perform a certain function or group of functions. Computer-executable instructions also include program modules that are executed by computers in stand-alone or network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for preventing web crawler access, comprising:
    receiving a request for a webpage that includes web content to be protected from a web crawler;
    generating, using one or more computer processors, a response to the request, including source code of an encrypted version of the webpage that includes the web content to be protected from the web crawler, wherein generating the response includes:
        encrypting the web content to be protected to generate encrypted content; and
        inserting a decryption instruction in the source code of the encrypted version of the webpage, wherein:
            the decryption instruction is configured to allow a web browser to decrypt the encrypted content;
            the decryption instruction comprises script code that operates on the encrypted content; and
            the decryption instruction is inserted at a random location in the source code of the encrypted version of the webpage; and
    sending the generated response.

2. The method of claim 1, wherein encrypting the web content includes:
    obtaining a mapping table of two character sequences, the first character sequence comprising a plurality of characters and the second character sequence comprising the plurality of characters in a random order; and replacing each character in the web content to be protected with a corresponding character in the mapping table.

3. The method of claim 2, wherein the decryption instruction comprises the mapping table.

4. The method of claim 2, wherein the decryption instruction includes a script that remaps the encrypted content according to the mapping table.

5. The method of claim 1, wherein encrypting the web content includes:
   obtaining a mapping table of two character sequences, the first character sequence comprising a plurality of characters and the second character sequence comprising the plurality of characters in a random order;
   converting the web content to be protected from a first encoding scheme to a second encoding scheme;
   replacing each character in the web content to be protected with a corresponding character in the mapping table to generate encrypted web content; and
   marking the encrypted web content using at least one Hypertext Mark-up Language (HTML) element tag.

6. The method of claim 5, wherein the first encoding scheme is American Standard Code for Information Interchange (ASCII) and the second encoding scheme is Unicode.

7. The method of claim 1, wherein the decryption instruction includes JavaScript-style code.

8. The method of claim 1, wherein the decryption instruction comprises a script code with a function name of a decryption call that is generated randomly.

9. A system comprising:
   an input interface configured to receive a request for a webpage that includes web content to be protected from a web crawler; and
   a processor coupled to the input interface, configured to:
      generate a response to the request, including source code of an encrypted version of the webpage that includes the web content to be protected from the web crawler, wherein to generate the response includes to:
         encrypt the web content to be protected to generate encrypted content; and
         insert a decryption instruction in the source code of the encrypted version of the webpage, wherein:
            the decryption instruction is configured to allow a web browser to decrypt the encrypted content;
            the decryption instruction comprises script code that operates on the encrypted content; and
            the decryption instruction is inserted at a random location in the source code of the encrypted version of the webpage; and
      send the generated response.

10. The system of claim 9, wherein to encrypt the web content includes to:
   obtain a mapping table of two character sequences, the first character sequence comprising a plurality of characters and the second character sequence comprising the plurality of characters in a random order; and
   replace each character in the web content to be protected with a corresponding character in the mapping table.

11. The system of claim 10, wherein the decryption instruction comprises the mapping table.

12. The system of claim 10, wherein the decryption instruction includes a script that remaps the encrypted content according to the mapping table.

13. The system of claim 9, wherein to encrypt the web content includes to:
   obtain a mapping table of two character sequences, the first character sequence comprising a plurality of characters and the second character sequence comprising the plurality of characters in a random order;
   convert the web content to be protected from a first encoding scheme to a second encoding scheme;
   replace each character in the web content to be protected with a corresponding character in the mapping table to generate encrypted web content; and
   mark the encrypted web content using at least one Hypertext Mark-up Language (HTML) element tag.

14. The system of claim 13, wherein the first encoding scheme is American Standard Code for Information Interchange (ASCII) and the second encoding scheme is Unicode.

15. The system of claim 9, wherein the decryption instruction includes JavaScript-style code.

16. The system of claim 9, wherein the decryption instruction comprises a script code with a function name of a decryption call that is generated randomly.

17. A computer program product for preventing web crawler access, the computer program product being embodied in a non-transitory computer readable storage medium and comprising computer instructions for:
   receiving a request for a webpage that includes web content to be protected from a web crawler;
   generating a response to the request, including source code of an encrypted version of the webpage that includes the web content to be protected from the web crawler, wherein generating the response includes:
      encrypting the web content to be protected to generate encrypted content; and
      inserting a decryption instruction in the source code of the encrypted version of the webpage, wherein:
         the decryption instruction is configured to allow a web browser to decrypt the encrypted content;
         the decryption instruction comprises script code that operates on the encrypted content; and
         the decryption instruction is inserted at a random location in the source code of the encrypted version of the webpage; and
   sending the generated response.

* * * * *